US008085515B2

(12) United States Patent
Yugou et al.

(10) Patent No.: US 8,085,515 B2
(45) Date of Patent: Dec. 27, 2011

(54) ELECTRIC POWER SOURCE FOR MOTOR VEHICLE

(75) Inventors: Masaki Yugou, Kakogawa (JP); Kimihiko Furukawa, Kakogawa (JP); Takeshi Osawa, Takasago (JP)

(73) Assignee: Sanyo Electric Co., Ltd., Osaka (JP)

( * ) Notice: Subject to any disclaimer, the term of this patent is extended or adjusted under 35 U.S.C. 154(b) by 693 days.

(21) Appl. No.: 11/723,517

(22) Filed: Mar. 20, 2007

(65) Prior Publication Data

US 2007/0221627 A1 Sep. 27, 2007

(30) Foreign Application Priority Data

Mar. 24, 2006 (JP) ................................ 2006-083998

(51) Int. Cl.
*H02H 7/08* (2006.01)

(52) U.S. Cl. ........................................................ 361/23

(58) Field of Classification Search ..................... 361/23
See application file for complete search history.

(56) References Cited

U.S. PATENT DOCUMENTS

| | | | | |
|---|---|---|---|---|
| 6,002,221 | A * | 12/1999 | Ochiai et al. | 318/139 |
| 7,608,940 | B2 * | 10/2009 | Osawa | 307/10.7 |
| 2005/0169018 | A1 * | 8/2005 | Hatai et al. | 363/37 |
| 2005/0253460 | A1 * | 11/2005 | Nakanishi et al. | 307/10.1 |
| 2006/0007622 | A1 * | 1/2006 | Furukawa et al. | 361/115 |
| 2006/0021098 | A1 * | 1/2006 | Tezuka | 903/922 |

FOREIGN PATENT DOCUMENTS

| | | |
|---|---|---|
| JP | 2000-173428 | 6/2000 |
| JP | 2000-270561 | 9/2000 |
| JP | 2004-14242 | 1/2004 |
| WO | 01/60652 | 8/2001 |

* cited by examiner

*Primary Examiner* — Rexford Barnie
*Assistant Examiner* — Ann Hoang
(74) *Attorney, Agent, or Firm* — Wenderoth, Lind & Ponack, LLP

(57) ABSTRACT

An electric power source for a motor vehicle is equipped with a welded state discriminator, and while a positive-side contactor and negative-side contactor are controlled to be switched off, the welded state discriminator detects a voltage of a positive-side contactor or negative-side contactor on its loading side with respect to a connecting point of a battery unit on a positive side and a battery unit on a negative side. Accordingly, when in a plus voltage where the detected voltage thus obtained is larger than a predetermined voltage, the positive-side contactor is judged to be in a welded state, and when in a minus voltage where the detected voltage is larger than the predetermined voltage, the negative-side contactor is judged to be in a welded state.

10 Claims, 8 Drawing Sheets

2A • • • BATTERY UNIT ON A POSITIVE SIDE
2B • • • BATTERY UNIT ON A NEGATIVE SIDE
3 • • • CONTACTOR
3A • • • POSITIVE-SIDE CONTACTOR
3B • • • NEGATIVE-SIDE CONTACTOR

ELECTRIC POWER SOURCE FOR MOTOR VEHICLE

BACKGROUND OF THE INVENTION

1. Field of the Invention

The present invention relates to an electric power source which is installed in a motor vehicle such as a hybrid vehicle, electric vehicle and fuel-cell vehicle to supply electric power to a motor for driving the vehicle, and also pertains to a welded state detection method for discriminating an electrically welded state of a contactor mounted to the power source.

2. Description of the Related Art

An electric power source for a motor vehicle connects positive-side and negative-side contactors respectively on its output side. The contactor is switched on or off by means of an ignition switch in the vehicle. When the ignition switch is turned on, the contactor is also switched on, so that a driving motor comes to be electrically supplied from the power source. When the ignition switch is turned off, the contactor is switched off, so that output power from the power source is separated from a loading side, thus avoiding an unwanted discharge of a battery as well as improving safety.

Since electric current of an extremely large amount up to several hundred amperes, which flows to the loading side, is passed through the contactor, such large current tends to cause the contactor to be electrically welded at its point of contact. When the contact point is welded, it becomes impossible to cut off output power from the power source even when the ignition switch is turned off. In order to avoid such a difficulty, there have been developed apparatuses for detecting a welded state of the contactor.

SUMMARY OF THE INVENTION

Power sources disclosed in Japanese Patent Laid-Open Publication No. 2000-173428 and WO 01/060652 are designed to judge a welded state of a contactor 93 by using a photo-coupler 92 to detect a flow of an electric current through a closed circuit which includes a contact point of the contactor 93 and a battery 91, as shown in FIG. 1. When the contactor 93 is welded, the current flows through the closed circuit via the contactor 93, and when the contactor 93 is switched off, the current is cut off and does not flow through the closed circuit. Thus, a welded state of the contactor 93 is judged by detecting the flow of a current through the closed circuit.

A power source disclosed in Japanese Patent Laid-Open Publication No. 2000-270561 is designed to detect an output voltage at positive-side and negative-side contactors to judge a welded state of a contactor.

A power source also disclosed in Japanese Patent Laid-Open Publication No. 2004-14242 is designed to judge a welded state of a contactor by detecting a current flowing through a three-phase motor which is connected to the power source via an inverter. When positive-side and negative-side contactors are switched off in a normal manner, output power from the power source is cut off, so that the three-phase motor does not have a current passed through any of its three lines. However, when the contactor is welded and thus the inverter is electrically powered, a current flows through the three-phase motor, so that when a current is detected in the three-phase motor, a welded state of the contactor can be judged.

Any of the power sources disclosed in the above-mentioned publications is prone to carry the disadvantage that the circuit for detecting a welded state of the contactor is of a complicated nature, resulting in a higher cost to be involved.

The present invention has been made in order to overcome such conventional disadvantage, and it is the major object of the present invention to provide an electric power source for a motor vehicle, in which notwithstanding its very simplified circuit structure, a welded state can be unfailingly detected at positive-side and negative-side contactors while an ignition switch is turned off, and also to provide a method for detecting a welded state of the contactors.

The electric power source for a motor vehicle in accordance with an embodiment of the invention includes: a battery 1 for driving a motor vehicle (hereinafter referred to collectively as a driving battery), the driving battery 1 connecting a battery unit 2A (on a positive side) and a battery unit 2B (on a negative side) in series at a connecting point 8; a positive-side contactor 3A and a negative-side contactor 3B which are connected in series to the driving battery 1 on the positive side and the negative side respectively; a control circuit 7 controlling the positive-side contactor 3A and negative-side contactor 3B to be switched on or off; and a welded state discriminator 4, 34 for detecting a welded state of the contactor 3 at its contact points. The welded state discriminator 4, 34 includes: a voltage detector 5, 35 for detecting a voltage of the positive-side contactor 3A or negative-side contactor 3B on its loading side with respect to a connecting point 8 for the driving battery 1; and a judgment circuit 6, 36 for discriminating the welded state of the positive-side contactor 3A and negative-side contactor 3B, based on an amount of and a positive or negative property of the detected voltage which is obtained by the voltage detector 5, 35. The electric power source is so constructed and arranged that while the control circuit 7 controls the positive-side contactor 3A and negative-side contactor 3B to be switched off, the voltage detector 5, 35 in the welded state discriminator 4, 34 detects a voltage of the positive-side contactor 3A or negative-side contactor 3B on its loading side and then the judgment circuit 6, 36 compares such detected voltage with a predetermined voltage, so that when, in a state of a plus voltage where the detected voltage is larger than the predetermined voltage, the positive-side contactor 3A is judged to be in a welded state, and when in a state of a minus voltage where the detected voltage is larger than the predetermined voltage, the negative-side contactor 3B is judged to be in a welded state.

To define the statement "a voltage of a contactor on its loading side is larger than a predetermined voltage" as set forth in this disclosure, it means that the absolute value of a voltage detected on a loading side is larger than the absolute value of a predetermined value. Therefore, the statement "in a state of a plus voltage where a detected voltage is larger than a predetermined voltage" means that the detected voltage is a plus voltage, being higher than the predetermined voltage, while "in a state of a minus voltage where a detected voltage is larger than a predetermined voltage" means that the detected voltage is a minus voltage, being lower than the predetermined voltage.

The electric power source as described above has the advantage that notwithstanding its very simplified circuit structure, a welded state can be unfailingly detected at positive-side and negative-side contactors while an ignition switch is turned off. It is because, while controlling the positive-side and negative-side contactors to be switched off, the inventive electric power source and welded state detection method are so designed as to detect a voltage of the positive-side or negative-side contactor on its loading side with respect to the connecting point of the battery unit on the positive side and the battery unit on the negative side and then discriminate a welded state of the positive-side and negative-side contactors, based on an amount of and a positive or negative property of such detected voltage. According to an embodiment of the invention, when in a state of a plus voltage where the voltage of the contactor detected on its loading side is larger than the predetermined voltage, the positive-side contactor is judged to be in a welded state, and when in a state of a minus voltage where the voltage of the contactor detected on its loading side is larger than the predetermined voltage, the negative-side contactor is judged to be in a welded state. As such, in this invention, notwithstanding its very simplified circuit structure, the welded state of the positive-side and negative-side contactors can be unfailingly detected.

The electric power source for a motor vehicle in accordance with an embodiment of the invention is so constructed and arranged that while the control circuit 7 switches on the positive-side contactor 3A and switches off the negative-side contactor 3B, the voltage detector 5, 35 in the welded state discriminator 4, 34 detects a voltage of the positive-side contactor 3A or negative-side contactor 3B on its loading side, so that a voltage of the battery unit 2A on the positive side can be detected.

The electric power source for a motor vehicle in accordance with an embodiment of the invention is so constructed and arranged that while the control circuit 7 switches off the positive-side contactor 3A and switches on the negative-side contactor 3B, the voltage detector 5, 35 in the welded state discriminator 4, 34 detects a voltage of the positive-side contactor 3A or negative-side contactor 3B on its loading side, so that a voltage of the battery unit 2B on the negative side can be detected.

The electric power source as described above has the advantage that when a circuit fails which is specialized in detecting a voltage of a battery unit, the voltage detector in the welded state discriminator, instead, can detect the voltage of the battery unit, because the voltage detector is able to detect the voltage of the contactor on its loading side and detect the voltage of the battery unit on the positive side or of the battery unit on the negative side.

The electric power source allows a vehicle to be driven by avoiding the driving battery from becoming uncontrollable, because a voltage of the battery unit can be detected even when the circuit fails to detect the voltage of the battery unit.

The above and further objects of the present invention as well as the features thereof will become more apparent from the following detailed description to be made in conjunction with the accompanying drawings.

DETAILED DESCRIPTION OF THE PREFERRED EMBODIMENTS

Figure 1:
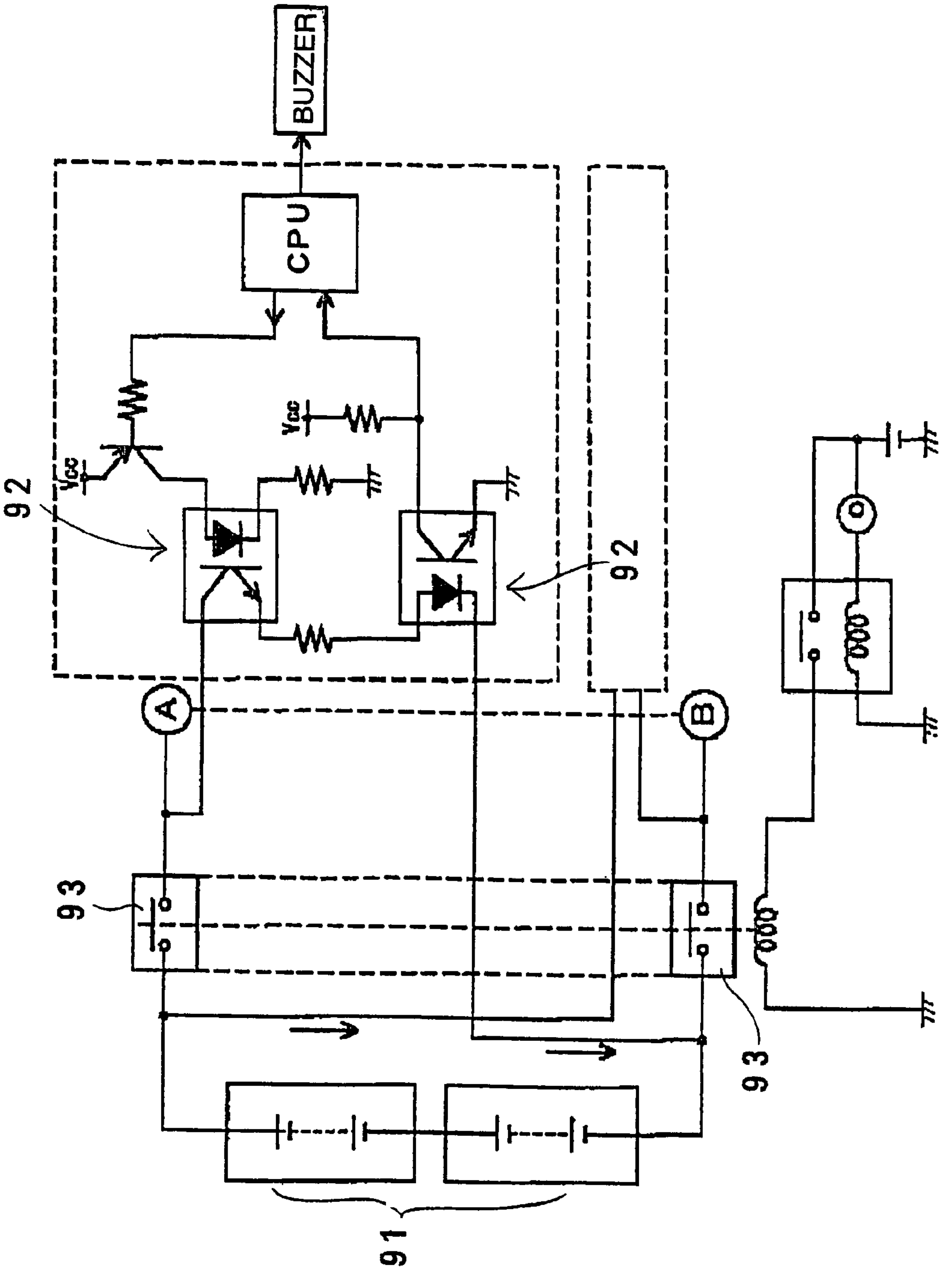
FIG. 1 PRIOR ART
FIG. 1 is a circuit diagram showing a conventional electric power source.
Figure 2:
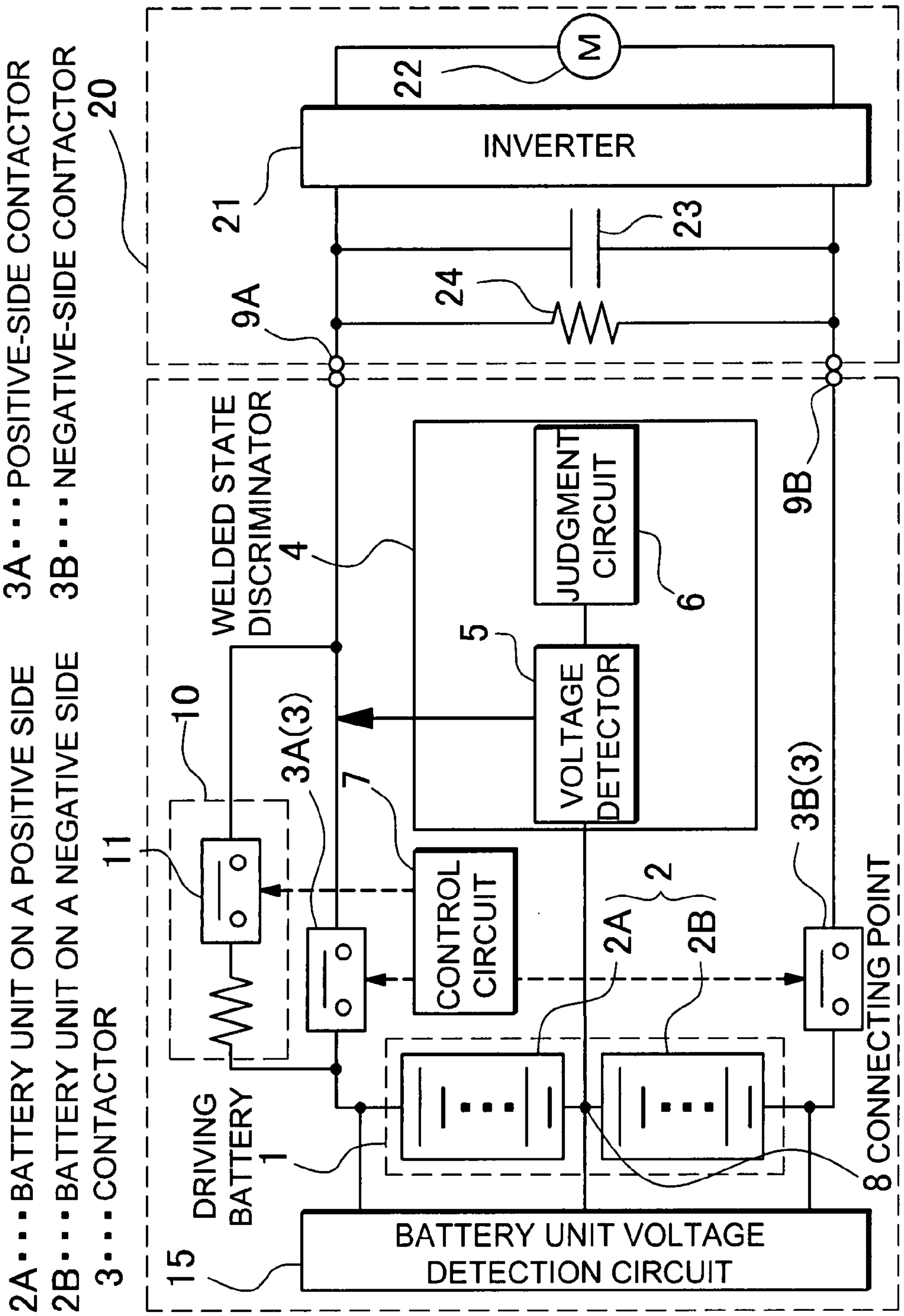
FIG. 2 is a block diagram illustrating an electric power source for driving a motor vehicle in accordance with an embodiment of the invention.

An electric power source for a motor vehicle shown in FIG. 2 is installed in a hybrid vehicle, in an electric vehicle or in a fuel-cell vehicle, so that the vehicle is allowed to run by driving a motor 22 that is connected as a load. The illustrated electric power source includes: a driving battery 1, the driving battery 1 connecting a battery unit 2A (on a positive side) and a battery unit 2B (on a negative side) in series; a positive-side contactor 3A and a negative-side contactor 3B being connected in series respectively to the positive side and the negative side of the driving battery 1 so that a load 20 is electrically powered; and a welded state discriminator 4 detecting a welded state of the contactor 3 at its contact points. The load 20 is typically the above-mentioned motor 22 being connected via an inverter 21, and the motor 22 is composed of a capacitor component and a resistor component in terms of an equivalent electric circuit as depicted in FIG. 2.

The load 20 has a capacitor 23, with a bulk capacitance, connected in parallel to the inverter 21. While the contactor 3 is switched on at its contact point, the capacitor 23 together with the driving battery 1 serves to supply electric power to the load 20. The capacitor 23, in particular, serves to instantaneously supply a high power to the load 20. By connecting the capacitor 23 in parallel to the driving battery 1, an instantaneous power supply to the load 20 can be made larger in amount. Since the power to be supplied from the capacitor 23 to the load 20 is proportional to the capacitance, the capacitor 23 is set to have a large capacitance ranging, for example, between 4000 and 6000 μF.

Connected in parallel to the capacitor 23 is a discharge resistor 24. After the positive-side contactor 3A and negative-side contactor 3B are switched off, the discharge resistor 24 quickly discharges an electric load which is stored in the capacitor 23. The duration of discharge from the capacitor 23 can be made shorter by reducing an electric resistance at the discharge resistor 24. It should be noted, however, that power consumption increases when the electric resistance is made smaller at the discharge resistor 24. This is because the power consumption at the discharge resistor 24 increases in inverse proportion to the electric resistance. Therefore, in view of the power consumption and the duration of discharge from the capacitor 23, the electric resistance at the discharge resistor 24 is set to be, for example, several tens of kΩ. The discharge resistor 24 may also be so arranged that a switch (not shown) is connected in series to the resistor 24 and switched on after the ignition switch is turned off to switch off the positive-side contactor 3A and negative-side contactor 3B, and thus the resistor 24 comes to be connected in parallel to the capacitor 23 so that the electric load can be discharged from the capacitor. Based on such a circuit structure, while the ignition switch is turned on to switch on the positive-side and negative-side contactors, a problem of power consumption by the discharge resistor can be solved by turning off the switch connected in series to the discharge resistor.

The illustrated driving battery 1 connects two sets of battery units 2 in series on the positive side and negative side. The battery unit 2 has a plurality of battery modules connected in series. The battery module has a linear plurality of secondary cells connected in series. The secondary cell is a secondary nickel hydrogen cell, lithium ion cell or the like. The battery module has five to six pieces of secondary cells connected in series. It should be noted, however, that the battery module may have secondary cells less than or equal to four pieces or more than or equal to seven pieces connected in series. Further, in the electric power source in accordance with the present invention, the battery unit does not necessarily have to be constructed with a battery module but a plurality of unit batteries or cells may also be connected in series to constitute the battery unit.

In the driving battery 1, its output voltage is set to be higher, for example, at several hundreds of V so that a high electric power may be supplied to the motor 22. It should be noted, however, that although not shown, the electric power source may also be so constructed and arranged that the driving battery has a DC/DC converter connected on its output side and thus the voltage from the driving battery may be boosted to supply a high power to the load. The electric power source is able to decrease the output voltage from the driving battery by reducing the number of secondary batteries or cells connected in series.

For the purposes of reference, with regard to an electric current which is supplied from the driving battery 1, the current value can be measured with a current sensor (not shown) which is connected in series, and the voltage level of each battery unit 2 can be checked by measuring a terminal voltage of the battery unit 2. Also with regard to an abnormal state of the current sensor, such abnormal state can be detected when a variation in electric current is small with respect to a variation in voltage of each battery unit 2 or of the driving battery 1. To be noted here is that although a certain extent of time lag tends to occur in measuring the current and the various voltages, the abnormal state of the current sensor can be detected as described above so far as a comparison is to be made on the basis of values to be measured within a given period.

The positive-side contactor 3A is connected between the positive side of the driving battery 1 and a positive output terminal 9A, while the negative-side contactor 3B is connected between the negative side of the driving battery 1 and a negative output terminal 9B. The positive-side contactor 3A and negative-side contactor 3B respectively have an exciting coil (not shown) controlling the contact points to be switched on or off. The positive-side contactor 3A and negative-side contactor 3B serve as a relay having the exciting coil each so that each of the two contactors may be independently controlled to be switched on or off. The positive-side contactor 3A and negative-side contactor 3B are controlled by a control circuit 7 to switch on the contact point for an electrical communication to the exciting coil and to switch off the contact point for the electrical communication to be suspended.

In the electric power source, when the ignition switch is turned on, the control circuit 7 keeps the positive-side contactor 3A in its switched-off state and switches on the negative-side contactor 3B; in such a state, a pre-charge relay 11 in a pre-charge circuit 10, connected in parallel to the positive-side contactor 3A, is switched on so that the capacitor 23 is pre-charged. After the capacitor 23 has been pre-charged, the control circuit 7 switches on the positive-side contactor 3A from its switched-off state to connect the driving battery 1 to the load 20. Subsequently, the pre-charge relay 11 in the pre-charge circuit 10 is switched off.

When the ignition switch in the vehicle is turned off, the control circuit 7 shuts down electrical communication of the exciting coils in the positive-side contactor 3A and negative-side contactor 3B. When in a normal operation, the positive-side contactor 3A and negative-side contactor 3B, with the communication of the exciting coils having been shut down, are switched off. However, when the contact point is in a welded state, these contactors remain in their switched-on state without being switched off again.

The welded state of the positive-side contactor 3A and negative-side contactor 3B at their contact points is detected by the welded state discriminator 4. The welded state discriminator 4 detects whether the positive-side contactor 3A and negative-side contactor 3B have been switched off in a normal manner after both of these contactors are controlled so as to be switched off by turning off the ignition switch to shut down the electrical communication of the exciting coils in the contactors.

The welded state discriminator 4 shown in FIG. 2 includes: a voltage detector 5 for detecting a voltage of the positive-side contactor 3A on the loading side with respect to the connecting point 8 for the driving battery 1; and a judgment circuit 6 for discriminating a welded state of the positive-side contactor 3A and negative-side contactor 3B, based on an amount of and a positive or negative property of the detected voltage which is obtained by the voltage detector 5. The battery unit 2A on the positive side and the battery unit 2B on the negative side may have either the same number of cells or a different number of cells, and therefore, the output voltage from each battery unit 2 may differ. Also, even when the same number of cells is contained in each battery unit 2, an output voltage from each battery unit may differ because of the variation in property of the battery cell.

Figure 3:
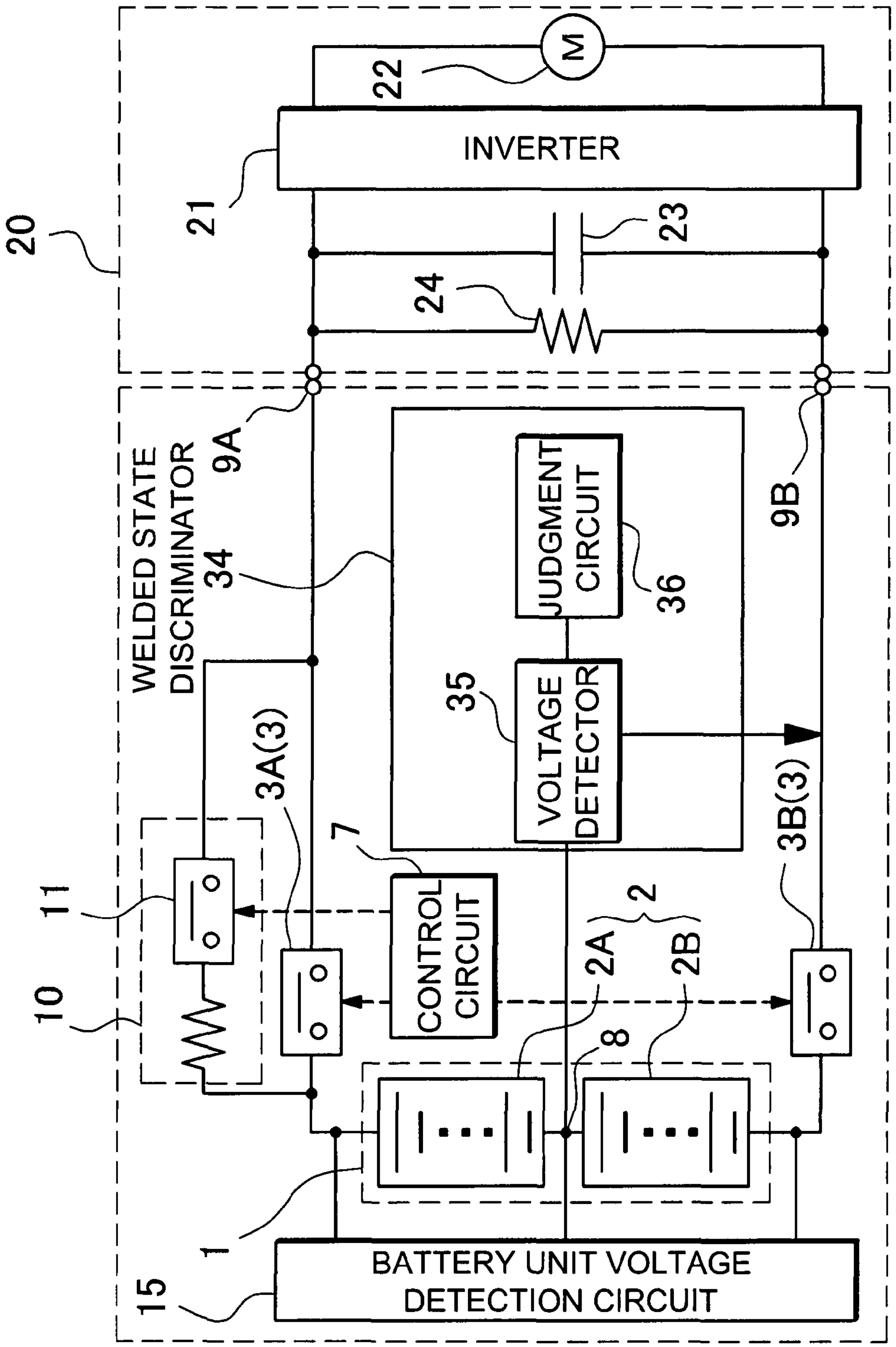
FIG. 3 is a block diagram illustrating an electric power source for driving a motor vehicle in accordance with an alternative embodiment of the invention.

The welded state discriminator 34 shown in FIG. 3 includes: a voltage detector 35 for detecting a voltage of the negative-side contactor 3B on the loading side with respect to the connecting point 8 for the driving battery 1; and a judgment circuit 36 for discriminating a welded state of the positive-side contactor 3A and negative-side contactor 3B, based on an amount of and a positive or negative property of the detected voltage which is obtained by the voltage detector 35.

The judgment circuit 6, 36 compares, with a predetermined voltage, the detected voltage which is obtained by the voltage detector 5, 35 and judges that the contactor 3 is in a welded state when the absolute value of the detected voltage is larger than the absolute value of the predetermined value. When the contact point of the contactor 3 is not in a welded state, a voltage is not outputted from the contactor 3 to the loading side. However, when the contact point of the contactor 3 is in a welded state, a voltage is outputted via the contactor 3 to the loading side. Thus, the contactor 3 is judged to be in a welded state when a voltage on the loading side is detected and the absolute value of the detected voltage is larger than the absolute value of the predetermined voltage.

Further, the judgment circuit 6, 36 detects whether a welded state in the contactor 3 has occurred at the positive-side contactor 3A or at the negative-side contactor 3B, corresponding with the detected voltage being a plus voltage or a minus voltage. It is because the welded positive-side contactor 3A outputs the plus voltage to the loading side, while the welded negative-side contactor 3B outputs the minus voltage to the loading side.

In the welded state discriminator 4 shown in FIG. 2, when the positive-side contactor 3A is in a welded state, the voltage detector 5 directly detects the plus voltage which is outputted from the welded positive-side contactor 3A to the loading side. Therefore, when the positive-side contactor 3A is in a welded state, the detected voltage, which is obtained by the voltage detector 5, becomes equal to the voltage of the battery unit 2A on the positive side. And, when the negative-side contactor 3B is in a welded state, the minus voltage, which is outputted from the welded negative-side contactor 3B, is detected via the discharge resistor 24 by the voltage detector 5. Since the electric resistance of the discharge resistor 24 is sufficiently small as compared with an input impedance of the voltage detector 5, the voltage detected by the voltage detector 5 becomes substantially equal to the voltage of the battery unit 2B on the negative side, in the state where the negative-side contactor 3B is welded.

Also in the welded state discriminator 34 shown in FIG. 3, when the negative-side contactor 3B is in a welded state, the voltage detector 35 directly detects the minus voltage which is outputted from the welded negative-side contactor 3B to the loading side. Therefore, when the negative-side contactor 3B is in a welded state, the detected voltage which is obtained by the voltage detector 35 becomes equal to the voltage of the battery unit 2B on the negative side. And, when the positive-side contactor 3A is in a welded state, the plus voltage outputted from the welded positive-side contactor 3A is detected via the discharge resistor 24 by the voltage detector 35. Since the electric resistance of the discharge resistor 24 is sufficiently small as compared with an input impedance of the voltage detector 35, the voltage detected by the voltage detector 35 becomes substantially equal to the voltage of the battery unit 2A on the positive side, in the state where the positive-side contactor 3A is welded.

As described above, when either of the positive-side contactor 3A and negative-side contactor 3B is in a welded state, its voltage on the loading side becomes substantially equal to the voltage of the battery unit 2. Therefore, the predetermined voltage, with which the judgment circuit 6, 36 compares the detected voltage to judge a welded state of the contactor 3, is set to be lower than the voltage of the battery unit 2A on the positive side or of the battery unit 2B on the negative side, for example, 20% to 80% of the voltage of the battery unit 2.

Figure 4:
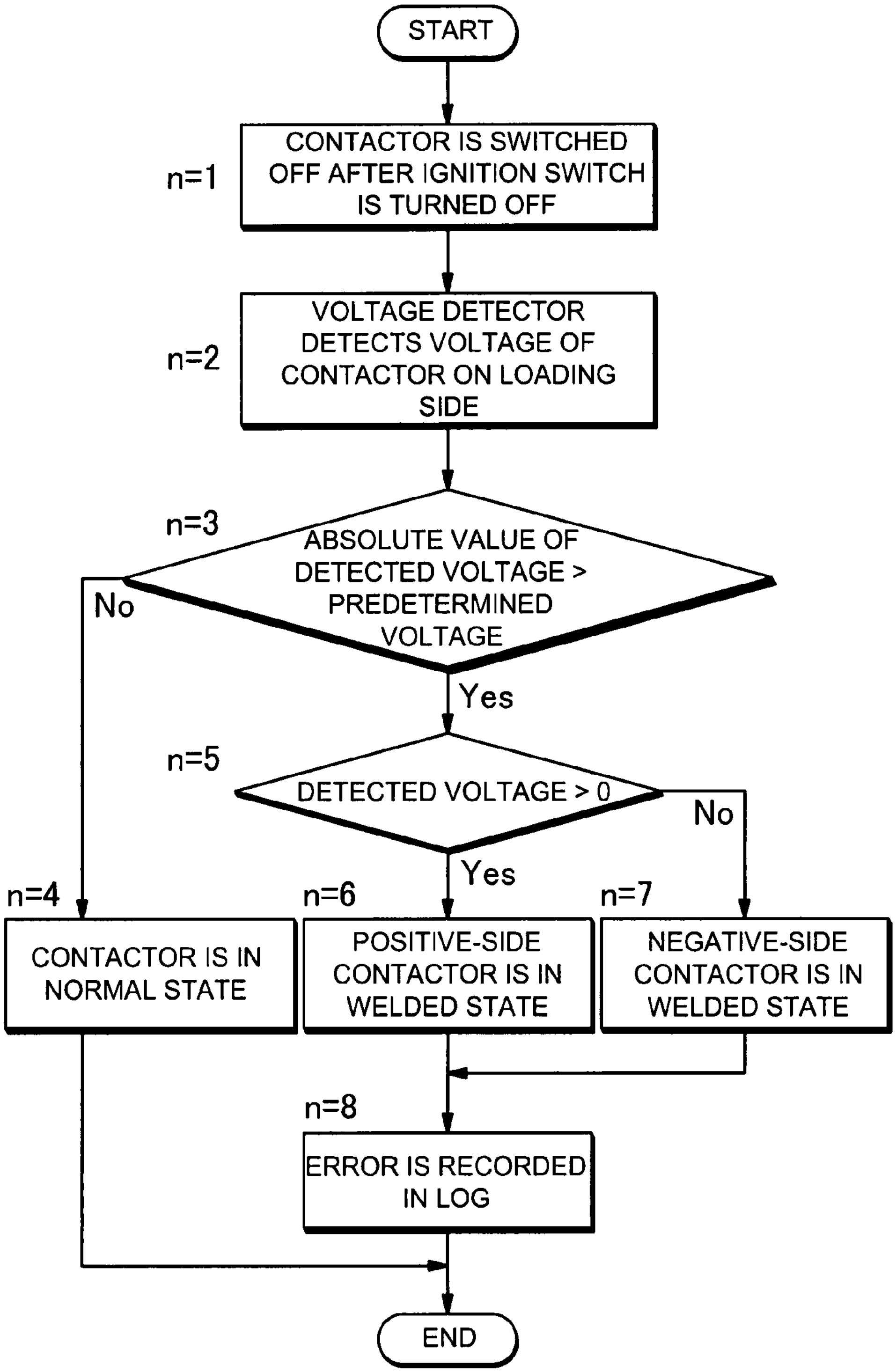
FIG. 4 is a flow chart employed for the welded state discriminator to judge a welded state of positive-side and negative-side contactors.

The welded state discriminator 4, 34 detects which of the positive-side contactor 3A and negative-side contactor 3B is in a welded state, in accordance with the ensuing steps illustrated in the flow chart in FIG. 4.

Step n=1

When the ignition switch in the vehicle is turned off, the control circuit 7 switches off the positive-side contactor 3A and negative-side contactor 3B. The control circuit 7 shuts down electrical communication to the exciting coil in the contactor to switch off the contactor. When in a normal operation, the contactor 3 with the communication to the exciting coil having been shut down is switched off. However, when the contact point is in a welded state, the contactor remains in its switched-on state without being switched off.

Step n=2

The voltage detector 5, 35 in the welded state discriminator 4, 34 detects a voltage of the contactor 3 on the loading side with respect to the connecting point 8 for the driving battery 1. In the welded state discriminator 4 shown in FIG. 2, the voltage detector 5 detects a voltage of the positive-side contactor 3A on the loading side. In the welded state discriminator 34 shown in FIG. 3, the voltage detector 35 detects a voltage of the negative-side contactor 3B on the loading side.

Steps n=3 and 4

The judgment circuit 6, 36 in the welded state discriminator 4, 34 compares, with the predetermined voltage, a detected voltage which is obtained by the voltage detector 5, 35. The comparison made by the judgment circuit 6, 36 is to find out whether the absolute value of the detected voltage thus obtained is larger than the absolute value of the predetermined voltage. The predetermined voltage, with which the judgment circuit 6, 36 compares the detected voltage to judge a welded state of the contactor 3, is set to be lower than the voltage of the battery unit 2A on the positive side or of the battery unit 2B on the negative side, for example, 20% to 80% of the voltage of the battery unit 2.

When the absolute value of the detected voltage is smaller than the absolute value of the predetermined value, the contactor 3 is judged to be in a normal state. When the absolute value of the detected voltage is larger than the absolute value of the predetermined voltage, the contactor 3 is judged to be in a welded state, and the operation in these steps is followed by Step n=5.

Steps n=5 through 7

By judging whether the detected voltage which is obtained by the voltage detector 5, 35 is a plus voltage or a minus voltage, a judgment is thus made as to whether the positive-side contactor 3A or the negative-side contactor 3B is in a welded state. When the detected voltage is a plus voltage, the positive-side contactor 3A is judged to be in a welded state, and when the detected voltage is a minus voltage, the negative-side contactor 3B is judged to be in a welded state.

Step n=8

The results of judgment as to a welded state of the contactor are recorded, and the series of the above operations comes to an end.

Figure 5:
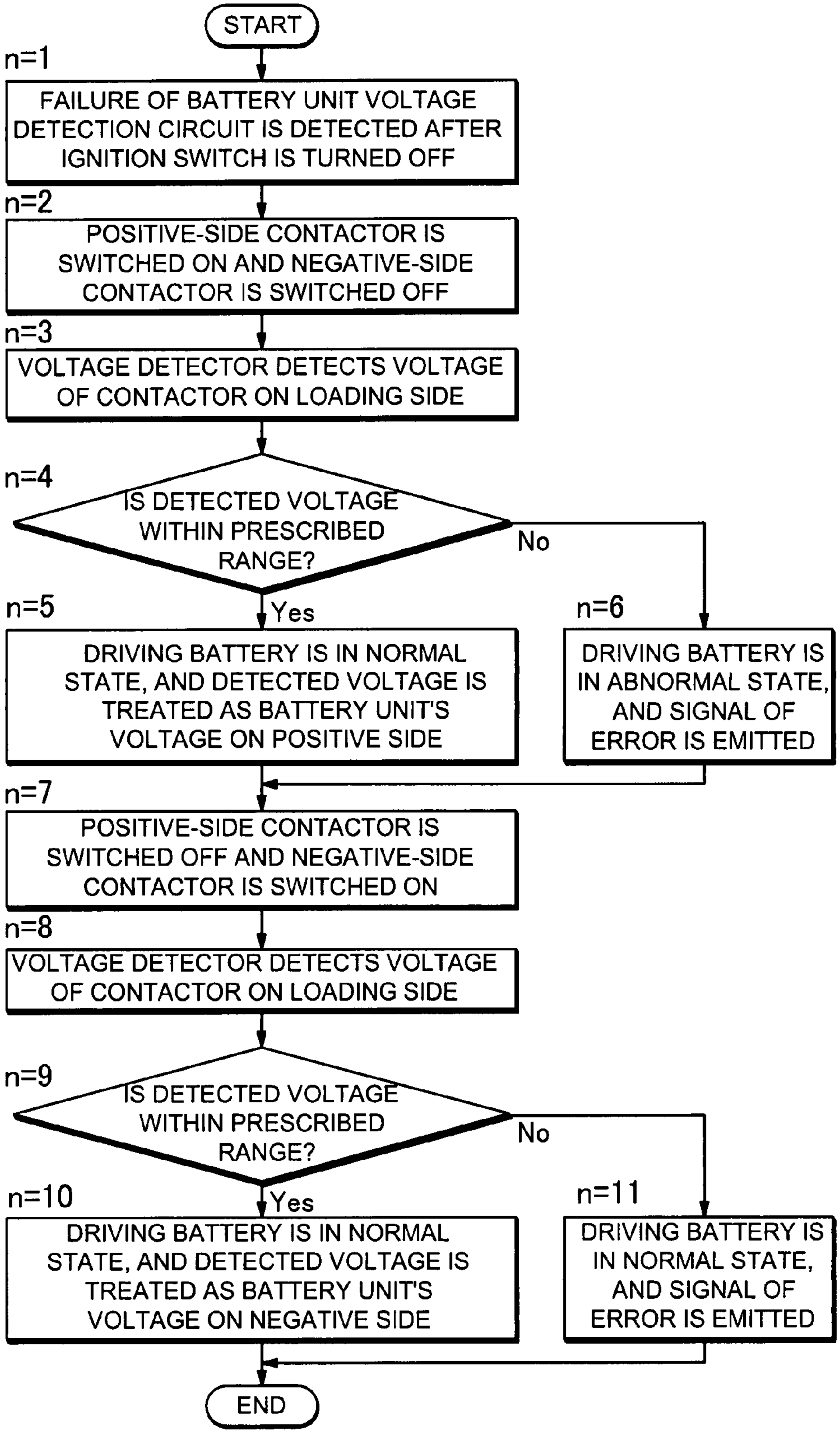
FIG. 5 is a flow chart employed for the welded state discriminator to detect a voltage of a battery unit on the positive side and a voltage of a battery unit on the negative side.

Further, the welded state discriminator 4, 34 detects a voltage of the battery unit 2A on the positive side and a voltage of the battery unit 2B on the negative side, in accordance with the ensuing flow chart shown in FIG. 5. The electric power source for the motor vehicle is provided with a battery unit voltage detection circuit 15 being specialized in detecting a voltage of the battery unit 2. The battery unit voltage detection circuit 15 detects the voltage of the battery unit 2 and controls a charge and discharge of the driving battery 1 based on such detected voltage. When the battery unit voltage detection circuit 15 is in failure, the voltage of the battery unit 2 cannot be detected, so that the driving battery 1 becomes uncontrollable, which leads to inability of driving the vehicle. In such an incident, if the voltage of the battery unit 2 can be detected by the welded state discriminator 4, 34, the vehicle can continue to run even when the battery unit voltage detection circuit 15 has failed. In the electric power source in accordance with the present invention, when the battery unit voltage detection circuit 15 is in failure, the welded state discriminator 4, 34, instead, serves to detect the voltage of the battery unit 2 in accordance with the flow chart as will be described below.

Step n=1

Failure of the battery unit voltage detection circuit is detected after the ignition switch in the vehicle is turned off.

Step n=2

The control circuit 7 switches on the positive-side contactor 3A and switches off the negative-side contactor 3B.

Step n=3

The voltage detector 5, 35 in the welded state discriminator 4, 34 detects a voltage of the contactor 3 on the loading side with respect to the connecting point 8 for the driving battery 1. In the welded state discriminator 4 shown in FIG. 2, the voltage detector 5 detects a voltage of the positive-side contactor 3A on the loading side. In the welded state discriminator 34 shown in FIG. 3, the voltage detector 35 detects a voltage of the negative-side contactor 3B on the loading side.

Steps n=4 through 6

A judgment is made on whether or not the detected voltage which is obtained by the voltage detector 5, 35 is within a normal range as a voltage of the battery unit 2. That is to say, the judgment is made on whether or not the detected voltage thus obtained is within a prescribed range of being higher than the minimum voltage level and lower than the maximum voltage level which will allow the battery unit 2 to be used as a battery. When the detected voltage is within such prescribed range, the driving battery 1 is judged to be in a normal state, and the detected voltage is treated as a voltage of the battery unit 2A on the positive side. When the detected voltage is outside the prescribed range, the driving battery 1 is judged to be in an abnormal state, and a signal of error is emitted accordingly.

Step n=7

The control circuit 7 switches off the positive-side contactor 3A and switches on the negative-side contactor 3B.

Step n=8

The voltage detector 5, 35 in the welded state discriminator 4, 34 detects a voltage of the contactor 3 on the loading side with respect to the connecting point 8 for the driving battery 1.

Steps n=9 through 11

A judgment is made on whether or not the detected voltage, which is obtained by the voltage detector 5, 35, is within a normal range as a voltage of the battery unit 2. That is to say, the judgment is made on whether or not the absolute value of the detected voltage thus obtained is within a prescribed range of being higher than the minimum voltage level and lower than the maximum voltage level which will allow the battery unit 2 to be used as a battery. When the detected voltage is within such prescribed range, the driving battery 1 is judged to be in a normal state, and the detected voltage is treated as a voltage of the battery unit 2B on the negative side. When the detected voltage is outside the prescribed range, the driving battery 1 is judged to be in an abnormal state, and a signal of error is emitted accordingly.

Figure 6:
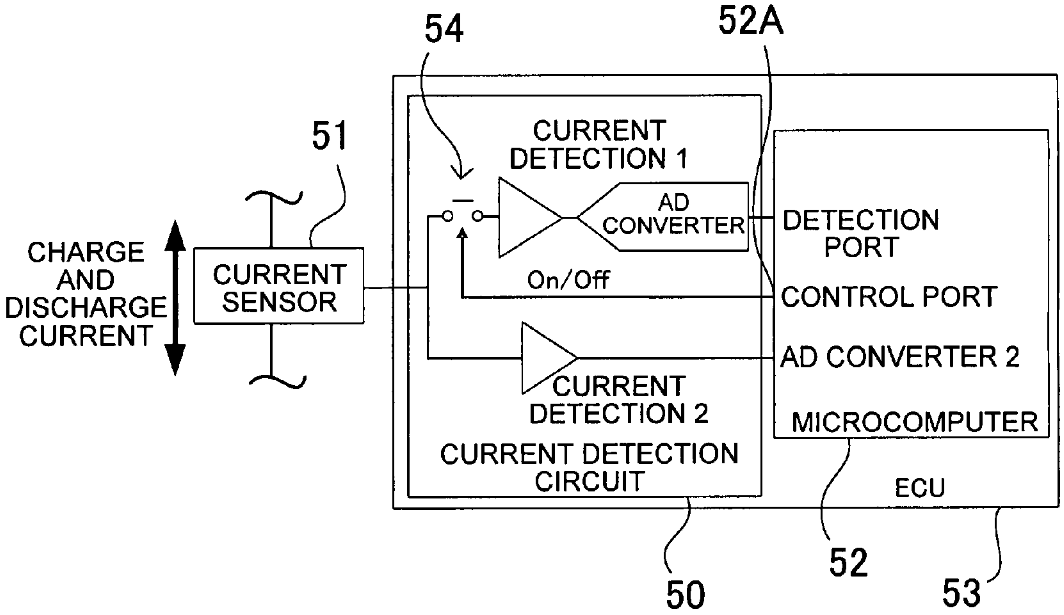
FIG. 6 is a block diagram illustrating an example of the current detection circuit.
Figure 7:
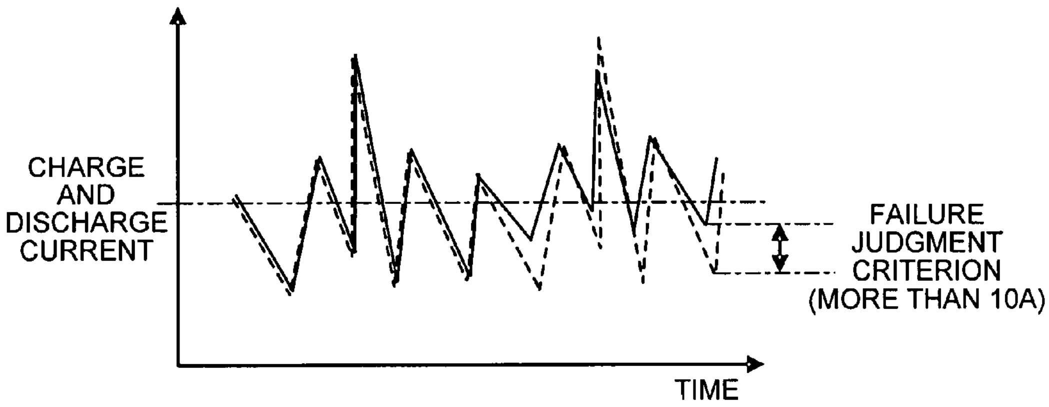
FIG. 7 is a graph depicting a circuit failure judgment with regard to the current detection circuit shown in FIG. 6.

It is also possible that an embodiment of the present invention is additionally provided with a current detection circuit 50 shown in FIG. 6. As illustrated in FIG. 6, when two circuits (current detections 1 and 2) are prepared in the current detection circuit 50 detecting an output from a current sensor 51 provided in a current path, it becomes possible to judge a circuit failure by detecting different current values when a failure occurs to one of the circuits. That is to say, a battery ECU 53 (a battery electronic control unit) including a microcomputer 52 for monitoring the state of the battery is used to judge a circuit failure, in a manner of emitting an ON signal from a control port 52A to switch on a switch 54, acquiring current values from the circuits for current detections 1 and 2, and comparing and judging the current values within the microcomputer 52, so that one of the circuits is judged to be in failure when a difference between these two current values is more than a prescribed value (e.g., 10A), as shown in the graph of a circuit failure judgment in FIG. 7.

In this method, the judgment is made in accordance with the following procedure. A detected value at 0 A (zero ampere) is checked at the time of start-up (during a 0 A period), so that when such detected value at 0 A is deviated to a large extent, a judgment is made on whether either of the circuits contained in the current detection circuit 50 is in failure. When both of the contained circuits are in a normal state, a subsequent judgment is made on a failure of the current detection circuit 50. It is also possible to make a judgment on a failure of the two circuits at 0 A by detecting that a module voltage does not vary after the start-up. It should be noted that when either of the circuits is in an abnormal state, a subsequent current detection is performed in a circuit which is in a normal state.

Figure 8:
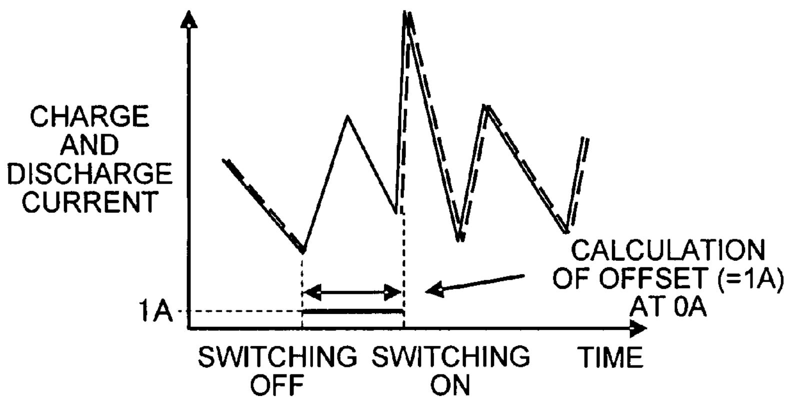
FIG. 8 is a graph depicting a circuit offset drift detection with regard to the current detection circuit shown in FIG. 6.

Also as shown in the graph of a circuit offset drift detection in FIG. 8, it is possible to accurately detect a current by switching off the switch 54 to detect an offset value at 0 A in one of the circuits and subsequently switching on the switch 54 to correct the offset value. Thus, as the circuit continues to be switched on or off at a given time, it becomes possible to detect a value of a temperature drift in the circuit, so that when such value is corrected, a current value can be detected in a highly accurate manner.

Figure 9:
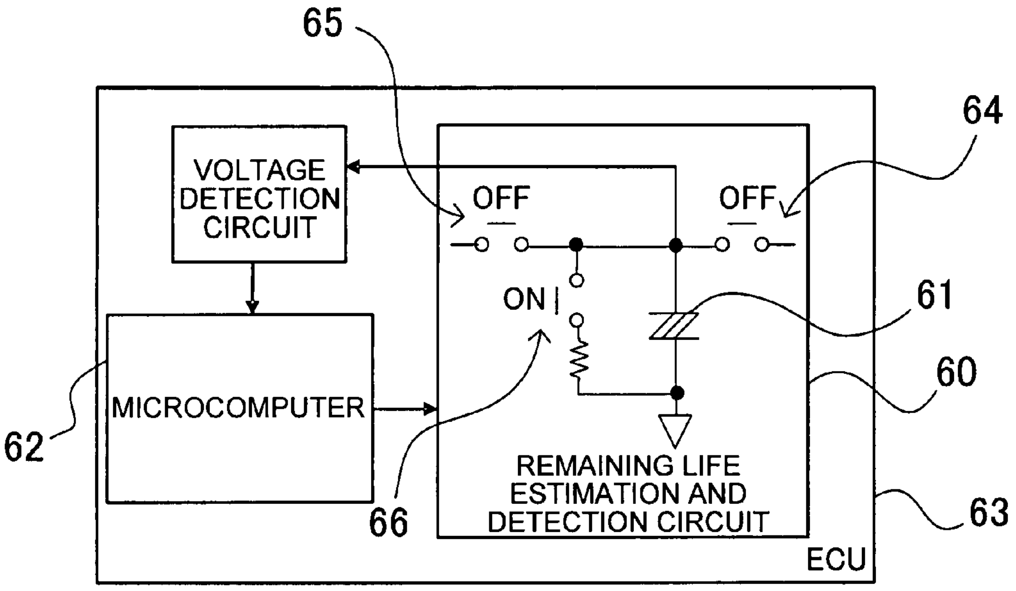
FIG. 9 is a block diagram illustrating an example of a remaining life estimation and detection circuit.
Figure 10:
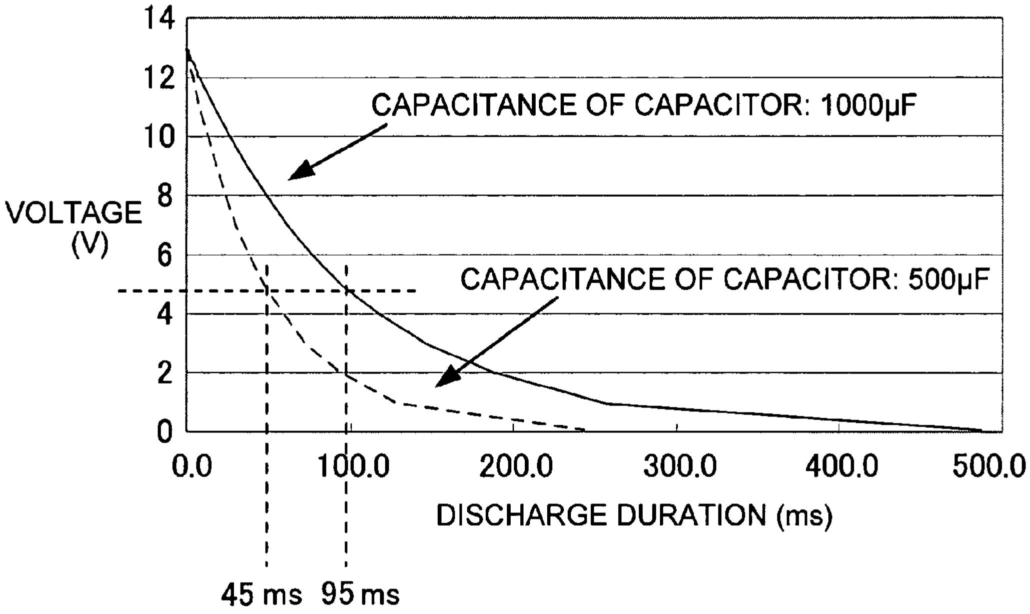
FIG. 10 is a graph depicting a relation between discharge duration and voltage regarding an electrolytic capacitor.

It is also possible that an embodiment of the present invention is additionally provided with a remaining life estimation and detection circuit 60 as shown in FIG. 9. A control unit for an HEV battery system installed in a hybrid vehicle requires the same length of its service life as that of the motor vehicle. A number of electrolytic capacitors are installed in the control unit, and the capacitor is to have a smaller amount of capacitance in the course of a long period of its service, eventually losing the function as required of a capacitor, which will also lead to the control unit losing its function. In order to solve such problem, when an electrolytic capacitor is provided specially for life estimation, or when the capacitor in the circuit is utilized which is in actual operation, the life estimation can be made in a simplified manner.

As shown in FIG. 9, when a battery ECU 63 (a battery electronic control unit) including a microcomputer 62 for monitoring the state of the battery is used, with the remaining life estimation and detection circuit 60 being installed, a service life of an electrolytic capacitor 61 and a service life of the control unit are estimated by controlling the microcomputer 62, in accordance with the following procedure.

(1) A voltage is measured before proceeding to the subsequent steps, where $V_0$=13V.

(2) Each switch 64, 65, 66 is controlled for an ON/OFF setting, and a time measurement is started.

(3) A time (t) is measured which is involved in reaching a voltage level of 5V. Such time (t) is, for example, 95 ms when the capacitor has a capacitance of 1000 μF, and 45 ms when the capacitor has a capacitance of 500 μF.

(4) A capacitance of the capacitor is calculated in accordance with the measured time.

(5) A judgment is made, within the microcomputer 62, as to whether the value of capacitance is within or outside a scope of a standard specification as compared with a value having been measured before a factory shipment.

(6) When the measured value of capacitance is within the scope of the standard specification, the remaining life is judged to be sufficient.

(7) When the measured value of capacitance is outside the scope of the standard specification, the remaining life is judged to be insufficient, and the fact of the insufficient life is informed to the user accordingly.

Also, in selecting an electrolytic capacitor to be used for life estimation, a capacitor with a shorter life than a capacitor for other applications is preferred, or a capacitor with a larger capacitance is preferred because such capacitor is more sensitive to a temperature variation or a capacity of variation is visible enough. These factors enable a capacity of variation to be measured accurately.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-83998 filed in Japan on Mar. 24, 2006, the content of which is incorporated herein by reference.

What is claimed is:

1. An electric power source for a motor vehicle comprising:

a driving battery for driving a motor vehicle, the driving battery including a positive-side battery unit and a negative-side battery unit connected in series at a connecting point;

a positive-side contactor and a negative-side contactor, the contactors being connected in series to the driving battery on the positive side and the negative side, respectively;

a control circuit controlling the positive-side contactor and negative-side contactor to be switched on or off;

a battery unit voltage detection circuit for detecting the voltage of the driving battery to control charging and discharging of the driving battery based on a detected voltage, the battery unit voltage detection circuit being connected with the driving battery at the connecting point, an output of the positive-side battery unit, and an output of the negative-side battery unit; and a welded state discriminator detecting a welded state of the contactors at contact points thereof, wherein the welded state discriminator comprises: a single voltage detector which is capable of detecting each output voltage of both the positive-side contactor and the negative-side contactor on a loading side thereof with respect to the connecting point for the driving battery; and a judgment circuit for discriminating the welded state of the positive-side contactor and the negative-side contactor, based on an amount of and a positive or negative property of the detected voltage which is obtained by the voltage detector, wherein the single voltage detector that is connected to the connecting point for the driving battery is directly connected to the loading side of either the positive-side contactor or the negative-side contactor, and capable of detecting each output voltage of both the positive-side contactor and the negative-side contactor, and wherein the electric power source is so constructed and arranged that while the control circuit controls both the positive-side contactor and negative-side contactor to be switched off substantially at the same time, the voltage detector in the welded state discriminator detects a voltage of at least one of the positive-side contactor and negative-side contactor on the loading side thereof and then the judgment circuit compares such detected voltage with a predetermined voltage, so that when in a state of a plus voltage where the detected voltage is larger than the predetermined voltage, the positive-side contactor is judged to be in a welded state, and when in a state of a minus voltage where the detected voltage is larger than the predetermined voltage, the negative-side contactor is judged to be in a welded state, the welded state discriminator being operable to identify which of the positive-side contractor or the negative-side contactor is in a welded state based on the detected voltage by a single detection of the output voltage of the contactor.

2. The electric power source for a motor vehicle as recited in claim 1, wherein the predetermined voltage is set to be 20% to 80% of the voltage of the battery unit.

3. The electric power source for a motor vehicle as recited in claim 1, wherein the electric power source is so constructed and arranged that while the control circuit switches on the positive-side contactor and switches off the negative-side contactor, the voltage detector in the welded state discriminator detects a voltage of the positive-side contactor on the loading side thereof, so that a voltage of the battery unit on the positive side is detected.

4. The electric power source for a motor vehicle as recited in claim 1, wherein the electric power source is so constructed and arranged that while the control circuit switches on the positive-side contactor and switches off the negative-side contactor, the voltage detector in the welded state discriminator detects a voltage of the negative-side contactor on the loading side thereof, so that a voltage of the battery unit on the positive side is detected.

5. The electric power source for a motor vehicle as recited in claim 1, wherein the electric power source is so constructed and arranged that while the control circuit switches off the positive-side contactor and switches on the negative-side contactor, the voltage detector in the welded state discriminator detects a voltage of the positive-side contactor on the loading side thereof, so that a voltage of the battery unit on the negative side is detected.

6. The electric power source for a motor vehicle as recited in claim 1, wherein the electric power source is so constructed and arranged that while the control circuit switches off the positive-side contactor and switches on the negative-side contactor, the voltage detector in the welded state discriminator detects a voltage of the negative-side contactor on the loading side thereof, so that a voltage of the battery unit on the negative side is detected.

7. The electric power source for a motor vehicle as recited in claim 1, wherein the electric power source further comprises a remaining life estimation and detection circuit, and the remaining life estimation and detection circuit is provided with an electrolytic capacitor for a life judgment, so that a capacitance of the electrolytic capacitor is detected to judge a life.

8. The electric power source for a motor vehicle as recited in claim 1, wherein the driving battery is connected in parallel to a capacitor which is capable of serving to supply an electric power to the motor vehicle, wherein the single voltage detector that is connected to the connecting point for the driving battery is directly connected to a loading side of one contactor, and wherein the single voltage detector is configured to detect an output voltage on a loading side outputted from another contactor via a discharge resistor which is in parallel to the capacitor.

9. The electric power source for a motor vehicle as recited in claim 8, wherein the discharge resistor is connected in series to a switch which is capable of controlling to discharge an electric load from the capacitor.

10. The electric power source for a motor vehicle as recited in claim 8, wherein the electric resistance of the discharge resistor is smaller than an input impedance of the voltage detector.

* * * * *